(12) United States Patent
Zhang et al.

(10) Patent No.: US 10,275,586 B2
(45) Date of Patent: Apr. 30, 2019

(54) METHOD FOR POWER MANAGEMENT USING FINGERPRINT IDENTIFICATION IN MOBILE TERMINAL AND MOBILE TERMINAL

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/975,887

(22) Filed: May 10, 2018

(65) Prior Publication Data

US 2018/0260551 A1    Sep. 13, 2018

Related U.S. Application Data

(63) Continuation of application No. PCT/CN2016/088395, filed on Jul. 4, 2016.

(30) Foreign Application Priority Data

Mar. 14, 2016 (CN) .......................... 2016 1 0147551

(51) Int. Cl.
*G06F 21/32* (2013.01)
*G06K 9/00* (2006.01)
(Continued)

(52) U.S. Cl.
CPC ............... *G06F 21/32* (2013.01); *G06K 9/00* (2013.01); *G06K 9/00087* (2013.01);
(Continued)

(58) Field of Classification Search
CPC ....... G06K 9/00087; G06K 2009/4666; G06K 9/46; G06K 9/00067; G06K 9/00;
(Continued)

(56) References Cited

U.S. PATENT DOCUMENTS 9,195,878 B2 * 11/2015 Weber ...................... G06F 3/044
9,836,592 B2 * 12/2017 Huang ..................... G06F 21/32
(Continued)

FOREIGN PATENT DOCUMENTS

CN        103605453 A    2/2014
CN        103714323 A    4/2014
(Continued)

OTHER PUBLICATIONS

International Search Report issued in corresponding international application No. PCT/CN2016/088395 dated Dec. 19, 2016.
(Continued)

*Primary Examiner* — Meless N Zewdu
(74) *Attorney, Agent, or Firm* — Young Basile Hanlon & MacFarlane, P.C.

(57) ABSTRACT

An unlocking method and a mobile terminal are provided. The method includes the following. An original fingerprint image is acquired to perform a fingerprint identification process and a power management service (PMS) of the mobile terminal is woken up when detecting a touch operation on a fingerprint identification module of the mobile terminal. The PMS lights up a screen when the fingerprint identification process is successful.

20 Claims, 10 Drawing Sheets

(51) Int. Cl.
*H04M 1/725* (2006.01)
*H04W 52/02* (2009.01)
*G06F 9/445* (2018.01)
*H04W 88/02* (2009.01)

(52) U.S. Cl.
CPC ..... *H04M 1/72577* (2013.01); *H04W 52/027* (2013.01); *H04W 52/0254* (2013.01); *H04W 52/0274* (2013.01); *G06F 9/445* (2013.01); *H04W 88/02* (2013.01); *Y02D 70/00* (2018.01); *Y02D 70/144* (2018.01); *Y02D 70/26* (2018.01)

(58) Field of Classification Search
CPC ........ G06K 9/62; G06K 9/0008; G06K 9/001; G06K 9/00107; G06F 21/32; G06F 21/36; G06F 9/445; G06F 21/81; H04W 4/02; H04W 12/06; H04W 88/02; H04W 12/00; H04W 12/08; H04W 92/08; H04W 52/0274; H04W 52/027; H04W 52/0254; H04W 52/02; H04W 52/00; H04W 52/0209; H04W 52/0261; H04W 52/0251; H04W 12/1205; H04M 1/725; H04M 1/72577; H04L 63/0861; Y02D 70/00; Y02D 70/144; Y02D 70/26; Y02D 10/17; Y02D 10/20; Y02D 70/44
See application file for complete search history.

(56) References Cited

U.S. PATENT DOCUMENTS

| | | | | |
|---|---|---|---|---|
| 2004/0125993 | A1* | 7/2004 | Zhao | G06K 9/00006 382/124 |
| 2009/0153297 | A1* | 6/2009 | Gardner | 340/5.83 |
| 2009/0292923 | A1* | 11/2009 | Kurisu | G06F 3/023 713/171 |
| 2010/0303310 | A1* | 12/2010 | Chiu | G06K 9/0008 382/124 |
| 2011/0306304 | A1* | 12/2011 | Forutanpour | G06F 3/04883 455/67.11 |
| 2012/0071149 | A1* | 3/2012 | Bandyyopadhyay et al. | 455/418 |
| 2014/0369572 | A1* | 12/2014 | Setlak | 382/124 |
| 2015/0146944 | A1* | 5/2015 | Pi et al. | G06K 9/00087 |
| 2015/0324570 | A1* | 11/2015 | Lee et al. | G06F 21/32 |
| 2015/0371073 | A1* | 12/2015 | Cho et al. | G06K 9/00006 |
| 2016/0092018 | A1* | 3/2016 | Lee | G06F 21/32 345/173 |
| 2016/0246396 | A1* | 8/2016 | Dickinson | G06F 3/03545 |
| 2016/0321492 | A1* | 11/2016 | Mankowski et al. | G06K 9/0002 |
| 2016/0371554 | A1* | 12/2016 | Lee | G06K 9/00892 |
| 2017/0075700 | A1* | 3/2017 | Abudi et al. | G06F 9/4418 |
| 2017/0076079 | A1 | 3/2017 | Ran et al. | |
| 2017/0076080 | A1* | 3/2017 | Hao | G06F 21/32 |
| 2017/0116455 | A1* | 4/2017 | Alameh | G06K 9/00013 |

FOREIGN PATENT DOCUMENTS

| | | |
|---|---|---|
| CN | 104008319 A | 8/2014 |
| CN | 104391635 A | 3/2015 |
| CN | 104573575 A | 4/2015 |
| CN | 104850433 A | 8/2015 |
| CN | 105159585 A | 12/2015 |
| CN | 105303090 A | 2/2016 |
| CN | 105389102 A | 3/2016 |
| WO | 2010126504 A1 | 11/2010 |

OTHER PUBLICATIONS

Extended European search report issued in corresponding European application No. 16894087.2 dated Jul. 30, 2018.

* cited by examiner

Prior Art

METHOD FOR POWER MANAGEMENT USING FINGERPRINT IDENTIFICATION IN MOBILE TERMINAL AND MOBILE TERMINAL

CROSS-REFERENCE TO RELATED APPLICATION(S)

This application is a continuation of International Application No. PCT/CN2016/088395, filed on Jul. 4, 2016, which claims priority to Chinese Patent Application No. 201610147551.X, filed on Mar. 14, 2016, the contents of both of which are hereby incorporated by reference in their entireties.

TECHNICAL FIELD

The present disclosure relates to the field of mobile terminal technology, and particularly to an unlocking method and a mobile terminal.

BACKGROUND

At present, fingerprint identification technology has become a standard configuration of mainstream mobile terminals. When the fingerprint identification technology is used in unlocking, waking up, and other functions of the mobile terminal in a screen-off state, this process can be achieved as extracting features, saving data and comparing, lighting up a screen, and unlocking a system. At the beginning, an original fingerprint image is read or acquired by a fingerprint reader, and then the acquired original fingerprint image is processed preliminarily to make it clearer. Thereafter, feature points of the processed original fingerprint image are compared with feature points of registered fingerprint templates. The screen can be lit up and the system can be unlocked when the processed original fingerprint image matches the registered fingerprint template. Time from reading the original fingerprint image to unlocking the system is generally called unlocking time.

The length of the unlocking time has become one aspect of competition of various manufacturers. How to optimize the unlocking time of the mobile terminal has become a technical problem to be solved in the field.

SUMMARY

Implementations of the disclosure provide an unlocking method and a mobile terminal to shorten the total time required to switch the mobile terminal from a screen-off state to a screen-on unlock state, which is beneficial to improving unlocking efficiency of the mobile terminal and user experience.

According to the implementations of the disclosure, there is provided an unlocking method. The method includes the following operations.

An original fingerprint image is acquired and a power management service (PMS) of a mobile terminal is woken up when detecting a touch operation on a fingerprint identification module of the mobile terminal.

A fingerprint identification process is performed on the original fingerprint image.

The PMS lights up a screen when the fingerprint identification process is successful.

BRIEF DESCRIPTION OF THE DRAWINGS

To describe the technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", and "fourth" used in the specification, the claims, and the accompanying drawings of the present disclosure are used for distinguishing between different objects rather than describing a particular order. The terms "include", "comprise", and "have" as well as variations thereof are intended to cover a non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Figure 1:
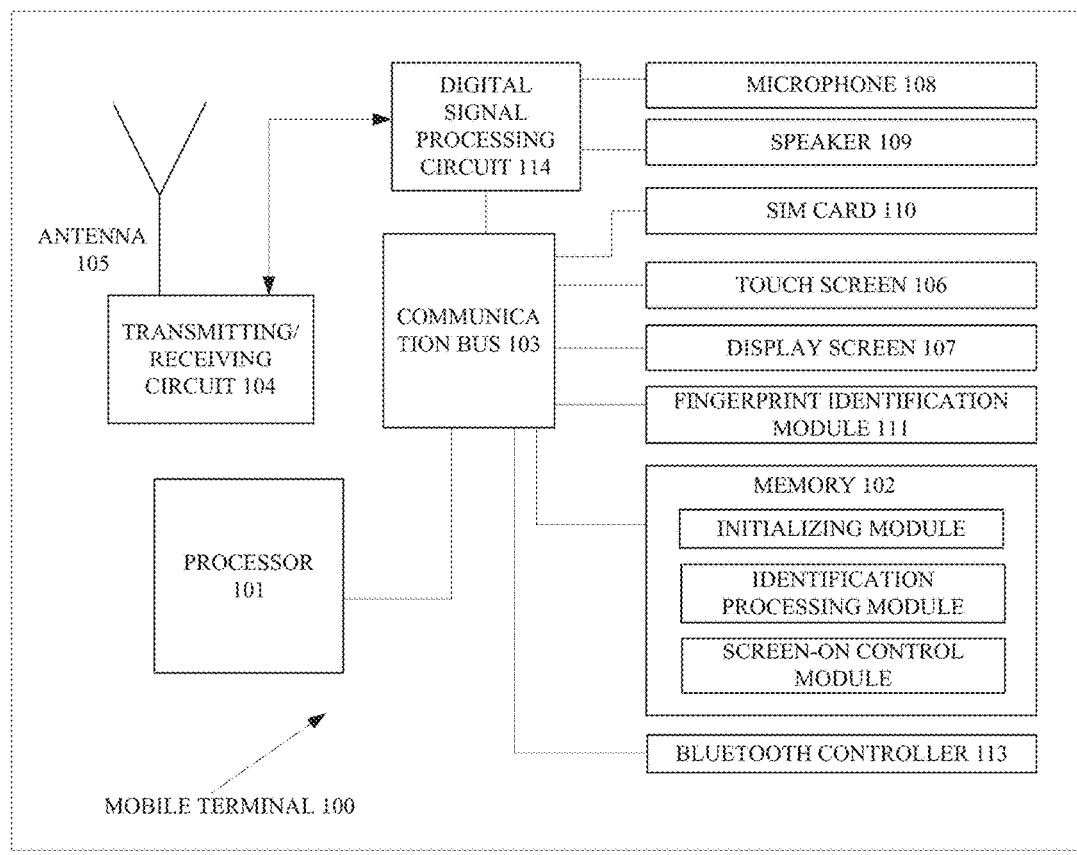
FIG. 1 is a schematic structural diagram illustrating a mobile terminal according to an implementation of the present disclosure.

To better understand an unlocking method and a mobile terminal of the implementations of the disclosure, a mobile terminal applicable to the implementations of the disclosure will be described hereinafter. FIG. 1 is an architecture diagram illustrating a mobile terminal 100 according to an implementation of the disclosure. The mobile terminal 100 in FIG. 1 can include at least one processor 101, at least one memory 102, at least one communication bus 103, a receiving/transmitting circuit 104, an antenna 105, at least one touch screen 106, at least one display screen 107, a microphone 108, a speaker 109, a SIM (subscriber identification module) card 110, a fingerprint identification module 111, a Bluetooth controller 113, and a digital signal processing circuit 114. The memory 102 includes at least one selected from a group including a random access memory, a non-volatile memory, and an external memory. The processor 101 is configured to control communication with an external cellular network through the receiving/transmitting circuit 104 and the antenna 105. The memory 102 stores instruction sets therein and the instruction sets are integrated with an operating system or application programs that can be executed by the processor 101. The instruction sets can instruct the processor 101 to execute the unlocking method of the implementations of the disclosure. For example, the mobile terminal can be any general electronic device such as a smart phone, a tablet, a laptop, or the like. Wearable devices in communication connection with the mobile terminal can be electronic devices such as smart bracelets, smart suits, smart shoes, and the like.

The processor 101 of the mobile terminal 100 can be coupled with the at least one memory 102. The memory 102 stores the instruction sets in advance, where the instruction sets include an initializing module, an identification processing module, and a screen-on control module. The memory 102 can further store a kernel module and the kernel module includes an operating system (e.g., WINDOWS™, ANDROID™, IOS™, etc.).

The processor 101 invokes the instruction sets to execute the unlocking method of the implementation of the disclosure as follows.

The processor 101 of the mobile terminal 100 executes the initializing module in the memory 102 to acquire an original fingerprint image (finger image capture) and wake up a power management service (PMS) of the mobile terminal (PMS wake up) when detecting a touch operation on a fingerprint identification module of the mobile terminal (interrupt request, IRQ).

The processor 101 of the mobile terminal 100 executes the identification processing module in the memory 102 to perform a fingerprint identification process on the original fingerprint image (fingerprint identify).

The processor 101 of the mobile terminal 100 executes the screen-on control module in the memory 102 to notify the PMS to light up a screen when the fingerprint identification process is successful.

According to the implementation, the mobile terminal can acquire the original fingerprint image to perform the fingerprint identification process and at the same time, wake up the PMS of the mobile terminal when detecting the touch operation on the fingerprint identification module of the mobile terminal. Thereafter, the mobile terminal can notify the PMS to light up the screen when detecting that the result of the fingerprint identification process is matched. As the mobile terminal wakes up the PMS immediately when the touch operation on the fingerprint identification module of the mobile terminal is detected, when the mobile terminal detects that the result of the fingerprint identification process is matched, there is no need to consume additional time to wake up the PMS; instead, the mobile terminal notifies the PMS to light up the screen according to the result of the comparison directly. Therefore, for the mobile terminal, the total time of switching from a screen-off state to a screen-on unlock state can be shortened, so as to help to improve unlocking efficiency of the mobile terminal and user experience.

As one implementation, the processor 101 is further configured to disable a loading service of a main lock-screen interface of the mobile terminal when detecting the touch operation on the fingerprint identification module of the mobile terminal.

As one implementation, the processor 101 is further configured to notify the PMS to enter a suspending state when detecting that the result of the fingerprint identification process is not matched. Alternatively, the processor 101 is further configured to notify the PMS to light up the screen, enable the loading service of the main lock-screen interface, and load the main lock-screen interface by the loading service of the main lock-screen interface when detecting that the result of the fingerprint identification process is not matched.

It can be seen that, when the mobile terminal detects that the result of the fingerprint identification process is not matched, to reduce power consumption of the device, the mobile terminal notifies the PMS to enter a suspending state, which is advantageous for saving power.

As one implementation, the processor 101 performs the fingerprint identification process on the original fingerprint image as follows.

Image enhancement is performed on the original fingerprint image to obtain a target fingerprint image.

Compare feature points of the target fingerprint image with feature points of a pre-stored registered fingerprint template.

The processor 101 can notify the PMS results of the comparison.

It should be noted that, the manner in which the fingerprint identification process is performed on the original fingerprint image can be various. The disclosure is not limited thereto. In addition, since the total time required for performing the fingerprint identification process is generally within 300 ms and it usually takes about 400 ms for the operating system of the mobile terminal to wake up the PSM, that is, if the process of performing the fingerprint identification process and the process of waking up the PSM are performed sequentially, a duration of about 700 ms will be consumed. By adopting the parallel processing manner described in the implementations of the disclosure, that is, when the mobile terminal starts to perform the fingerprint identification process, the process of waking up the PSM is performed simultaneously; in this manner, about 300 ms can be saved. As can be seen, the unlocking method of the implementations of the disclosure can shorten the time required to unlock the mobile terminal in the screen-on state and improve the user experience.

As one implementation, after the processor 101 notifies the PMS to light up the screen, the processor 101 is further configured to: load an application desktop of a system of the mobile terminal, load an application that was running when the screen of the mobile terminal was locked or turned off last time, or load a preset application.

As one implementation, N applications are running in the background of the mobile terminal and N is a positive integer. The processor 101 is further configured to obtain screen-on starting priorities corresponding to the N applications and load an application having the highest screen-on starting priority among the N applications after the processor 101 notifies the PMS to light up the screen.

As one implementation, after the processor 101 notifies the PMS to light up the screen, the processor 101 is further configured to: acquire a current system time, determine a screen-on time period corresponding to the current system time, determine a screen-on application desktop corresponding to the screen-on time period according to a preset mapping relation between screen-on time periods and screen-on application desktops of the mobile terminal, and load the screen-on application desktop.

Consistent with the technical solutions described above, an unlocking method provided herein will be detailed in the following.

Figure 2A:
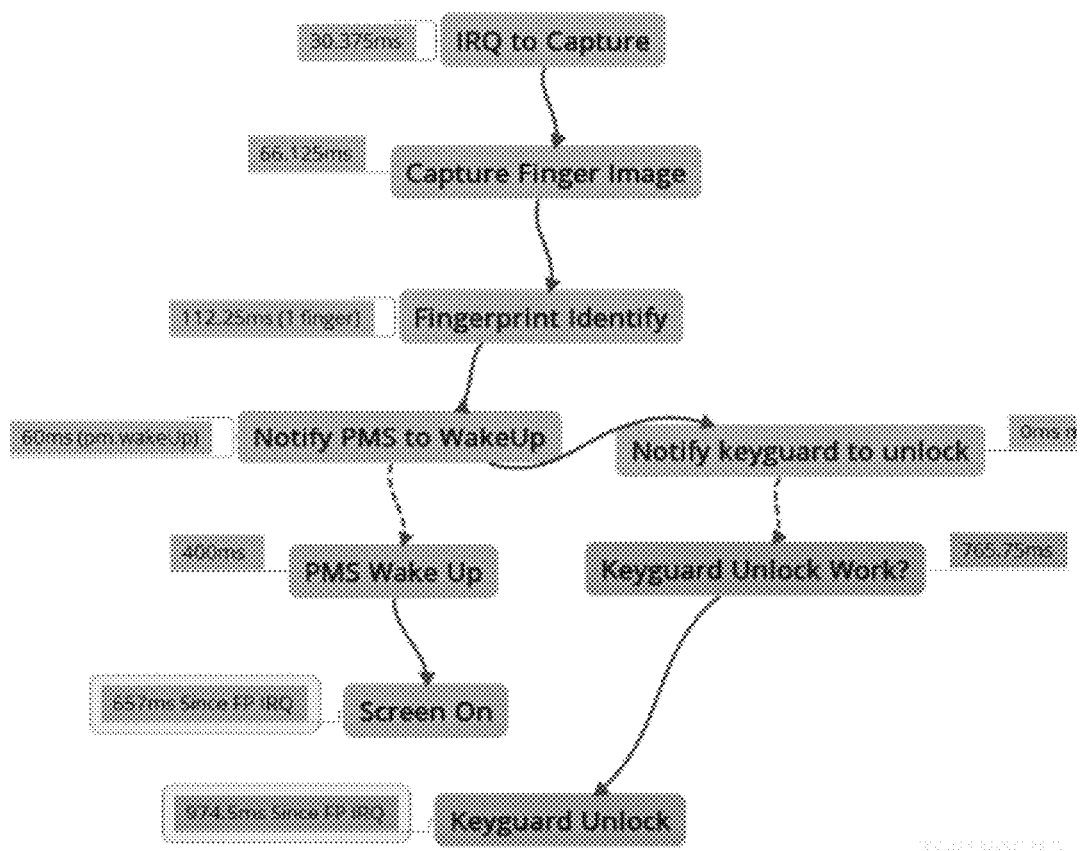
FIG. 2A is a schematic flow chart illustrating a black screen waking up procedure of the related art.

FIG. 2A is a schematic flow chart illustrating a black screen waking up procedure of the related art. As illustrated in FIG. 2A, in the related art, after an interrupt request (IRQ) to capture is initiated, a terminal will capture finger images and then conduct fingerprint identification. After that, the terminal will notify PMS to wake up, followed by operations of PMS wake-up and terminal screen-on. Thus, the time required to light up (screen on) the terminal from a black screen state (that is, screen-off state) is a sum of time durations of the above-mentioned operations, such as total time length=30.375 ms (IRQ to capture)+66.125 ms (capture finger image)+112.25 ms (fingerprint identify)+60 ms (notify PMS to wakeup)+400 ms (PMS wake up)+657 (screen on)=1325.75 ms.

Figure 2B:
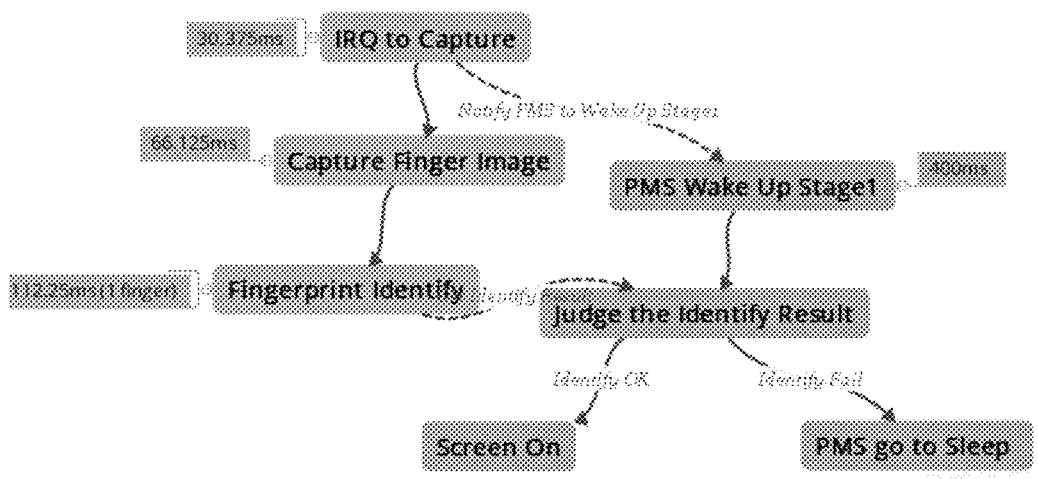
FIG. 2B is a schematic flow chart illustrating a black screen waking up procedure of this disclosure.

FIG. 2B is a schematic flow chart illustrating a black screen waking up procedure of this disclosure. As illustrated in FIG. 2B, different from the procedure of FIG. 2A, in the unlocking method provided herein, once the IRQ to capture is initiated, the terminal will capture finger images and notify PMS to wake up simultaneously. Or, the terminal will notify PMS to wake up during the capture of the image. That is, the terminal does not need to wait for the fingerprint identification to be finished to notify the PMS to wake up. As such, compared with the related art, the time required to screen on the terminal from a black screen state can be saved. As illustrated, after the fingerprint identification, the terminal will judge the result, if the identification is OK, screen on the terminal; otherwise, the PMS will go to sleep.

Figure 3A:
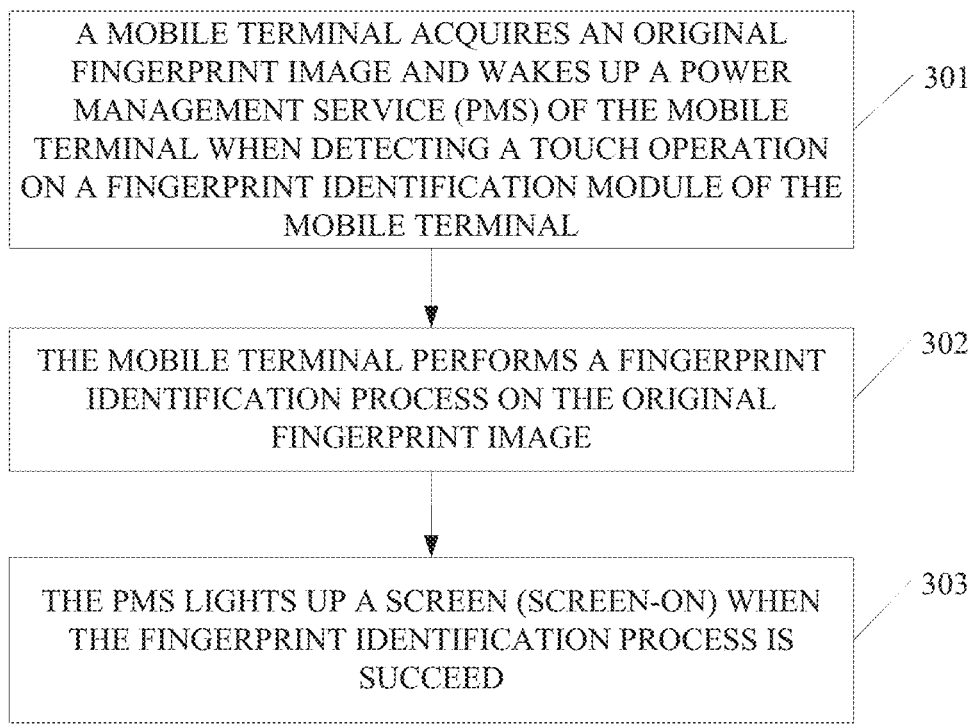
FIG. 3A is a schematic flow chart illustrating an unlocking method according to a first method implementation of the present disclosure.
Figure 3B:
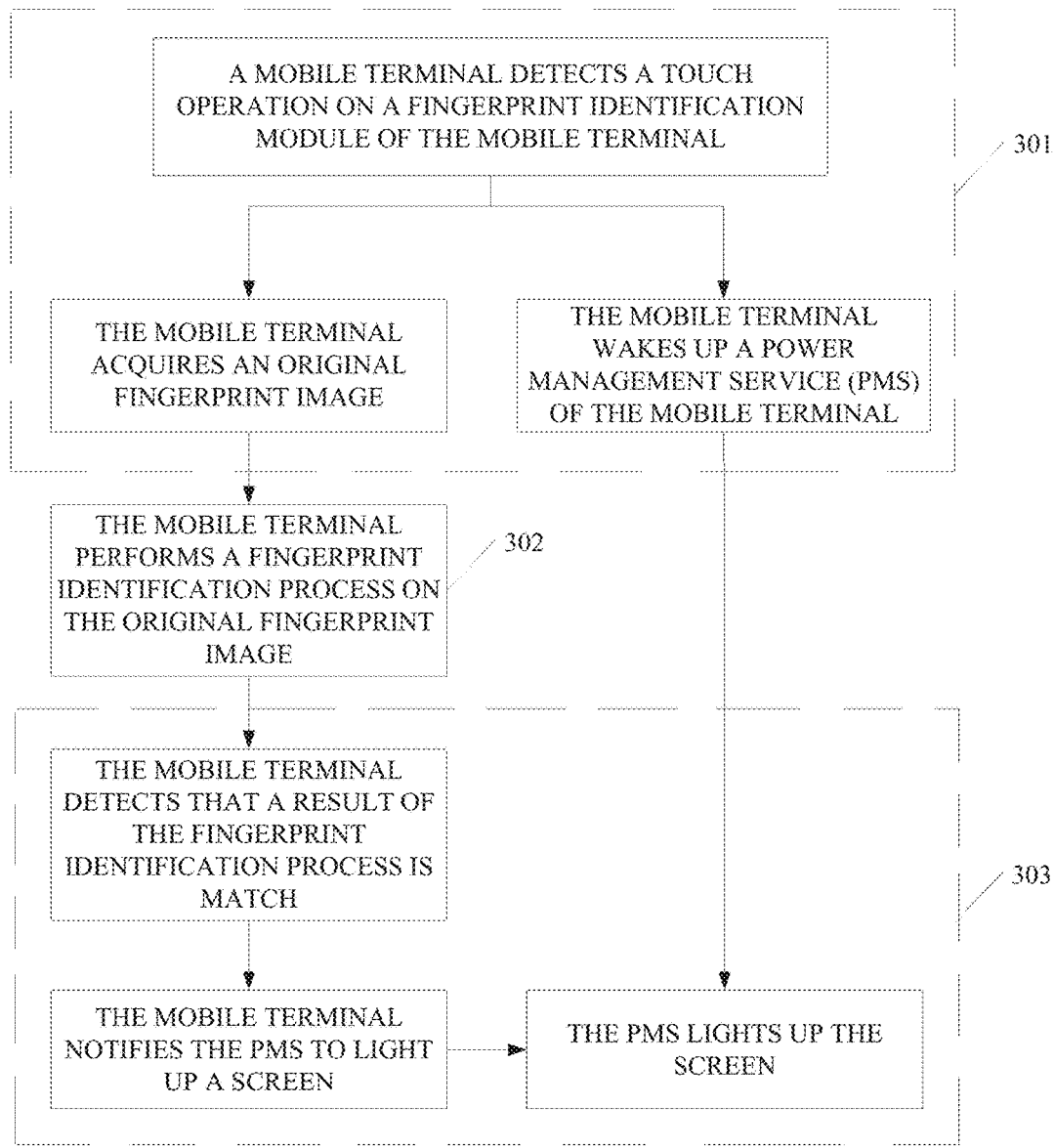
FIG. 3B is a schematic flow chart illustrating an unlocking method according to a first method implementation of the present disclosure.

FIGS. 3A and 3B are schematic flow charts illustrating an unlocking method according to a first method implementation of the present disclosure. Although the unlocking method described herein is executed based on the mobile terminal illustrated in FIG. 1, it should be noted that, the operation environment of the unlocking method disclosed in the implementation of the disclosure is not limited to the above mobile terminal.

As illustrated in FIGS. 3A and 3B, the unlocking method of the implementation of the disclosure begins at block 301.

At block 301, the mobile terminal acquires an original fingerprint image and wakes up a power management service (PMS) of the mobile terminal when detecting a touch operation on a fingerprint identification module of the mobile terminal. As one implementation, the mobile terminal initiates an interrupt request (IRQ) to trigger the acquisition of the original fingerprint image upon detection of the touch operation.

As illustrated in FIG. 3B, acquisition of the original fingerprint image and waking up of the PMS are conducted in a serial manner, which is quite different from that of the related art in which these two operations are conducted sequentially.

At block 302, the mobile terminal performs a fingerprint identification process on the original fingerprint image.

It can be understood that, the mobile terminal can perform the fingerprint identification process on the original fingerprint image in various implementation manners. The disclosure is not particularly restricted herein.

As one example, the mobile terminal performs the fingerprint identification process on the original fingerprint image as follows.

The mobile terminal performs image enhancement on the original fingerprint image to obtain a target fingerprint image.

The mobile terminal compares feature points of the target fingerprint image with feature points of a pre-stored registered fingerprint template.

At block 303, the PMS lights up a screen (screen on) when the fingerprint identification process is successful, that is, when the target fingerprint image is matched with the fingerprint template. As illustrated in FIG. 3B, the PMS will then light up the screen. When the fingerprint identification process fails, the PMS will go to sleep.

When the mobile terminal detects that the result of the fingerprint identification process is matched, the mobile terminal can further remove a main lock-screen interface loaded by a loading service and load a preset interface. Alternatively, the loading service of the main lock-screen interface can be disabled, that is to say, in the case that the loading service of the main lock-screen interface has been disabled, after the mobile terminal controls the PMS to light up the screen, the mobile terminal can load the preset interface directly.

According to the implementation, the mobile terminal can acquire the original fingerprint image to perform the fingerprint identification process and at the same time, wake up the PMS of the mobile terminal when detecting the touch operation on the fingerprint identification module of the mobile terminal. And then, the mobile terminal can notify the PMS to light up the screen when detecting that the result of the fingerprint identification process is matched. Since the mobile terminal starts to wake up the PMS when detecting the touch operation on the fingerprint identification module of the mobile terminal, when the mobile terminal detects that the result of the fingerprint identification process is matched, there is no need to take additional time to wake up the PMS; instead, the mobile terminal notifies the PMS to light up the screen according to the result of the comparison directly. As a result, the total time required to switch the mobile terminal from a screen-off state to a screen-on unlock state can be reduced, and unlocking efficiency of the mobile terminal and user experience can be improved.

As one implementation, in this implementation, the mobile terminal is further configured to execute the following operations.

The mobile terminal disables the loading service of the main lock-screen interface of the mobile terminal when detecting the touch operation on the fingerprint identification module of the mobile terminal.

As one implementation, in this implementation, the mobile terminal is further configured to execute the following operation.

The mobile terminal notifies the PMS to enter a suspending state when detecting that the result of the fingerprint identification process is not matched. Alternatively, the mobile terminal can notify the PMS to light up the screen, enable the loading service of the main lock-screen interface, and load the main lock-screen interface by the loading service of the main lock-screen interface when detecting that the result of the fingerprint identification process is not matched.

It can be seen that, when the mobile terminal detects that the result of the fingerprint identification process is not matched, in order to reduce power consumption of the device, the mobile terminal notifies the PMS to enter a suspending state to save power.

As one implementation, in this implementation, after the mobile terminal notifies the PMS to light up the screen, the mobile terminal is further configured to execute the following operations.

The mobile terminal loads an application desktop of a system of the mobile terminal.

Alternatively, the mobile terminal loads an application that was running when the screen of the mobile terminal was locked or turned off last time.

Alternatively, the mobile terminal loads a preset application.

As one implementation, the mobile terminal has N applications running in the background and N is a positive integer. After the mobile terminal notifies the PMS to light up the screen, the mobile terminal is further configured to execute the following operations.

The mobile terminal obtains screen-on starting priorities corresponding to the N applications.

The mobile terminal loads an application having the highest screen-on starting priority among the N applications.

For instance, a weather application, instant messaging apps (such as QQ® and WeChat®), a payment app (such as Alipay®), a music player (such as TTPOD), and a system application are running in the background of the mobile terminal. In addition, the TTPOD has the highest screen-on starting priority. As a result, the mobile terminal will load an application interface of the TTPOD, for example, a music-playing lyrics-displaying interface corresponding to a currently played song, a main interface of the TTPOD, or the like can be loaded.

In this implementation, the mobile terminal lights up and unlocks the screen conveniently, besides, it is also possible to easily load on the current screen a background running application with higher priority, which is beneficial to improving the user experience.

As one implementation, in this implementation, after the mobile terminal notifies the PMS to light up the screen, the mobile terminal is further configured to execute the following operations.

The mobile terminal acquires a current system time.

The mobile terminal determines a screen-on time period corresponding to the current system time.

The mobile terminal determines a screen-on application desktop corresponding to the screen-on time period according to a preset mapping relation between screen-on time periods and screen-on application desktops of the mobile terminal.

The mobile terminal loads the screen-on application desktop.

For instance, the mobile terminal includes three application desktops, that is, application desktop 1, application desktop 2, and application desktop 3. Application desktop 1 is mainly provided with office applications such as a notepad, a mailbox application, an intra-enterprise chat application, and so on. Application desktop 2 is mainly provided with entertainment applications such as various game applications, music players, video players, etc. Application desktop 3 is mainly provided with other types of applications such as ride-hailing applications, various system applications, and the like. The user can preset a mapping relation between the three application desktops and different time periods. For example, 9:00 a.m. to 12:00 noon and 2:00 p.m. to 5:00 p.m. are set as working time periods and correspond to application desktop 1. 12:00 noon to 2:00 p.m. is set as an entertainment time period and corresponds to application desktop 2. When the mobile terminal detects that the current system time is 10:00 a.m., the mobile terminal determines the corresponding screen-on time period as the working time period. After the mobile terminal determines that application desktop 1 corresponds to the working time period, the mobile terminal loads application desktop 1. In this way, it helps to improve convenience for the user in using applications corresponding to different time periods and improve user experience.

Furthermore, after the mobile terminal notifies the PMS to light up the screen, the mobile terminal can further determine a target application among the applications of the mobile terminal and loads the target application. The target application refers to an application that is most frequently used in the time period corresponding to the current system time. For example, the user usually opens the Uber™ app at 9:30 p.m., so the mobile terminal can record in advance usage times or usage frequencies of various applications used by the user after 9:00 p.m. in the last month for example. After the mobile terminal notifies the PMS to light up the screen, the mobile terminal can query an application with the most usage time or highest usage frequency based on the recorded history record (usage times or usage frequencies of applications in a certain time period or different time periods) and loads the application. Therefore, it is possible to provide the user with application loading service more conveniently and smartly and help to improve the user experience.

Figure 4A:
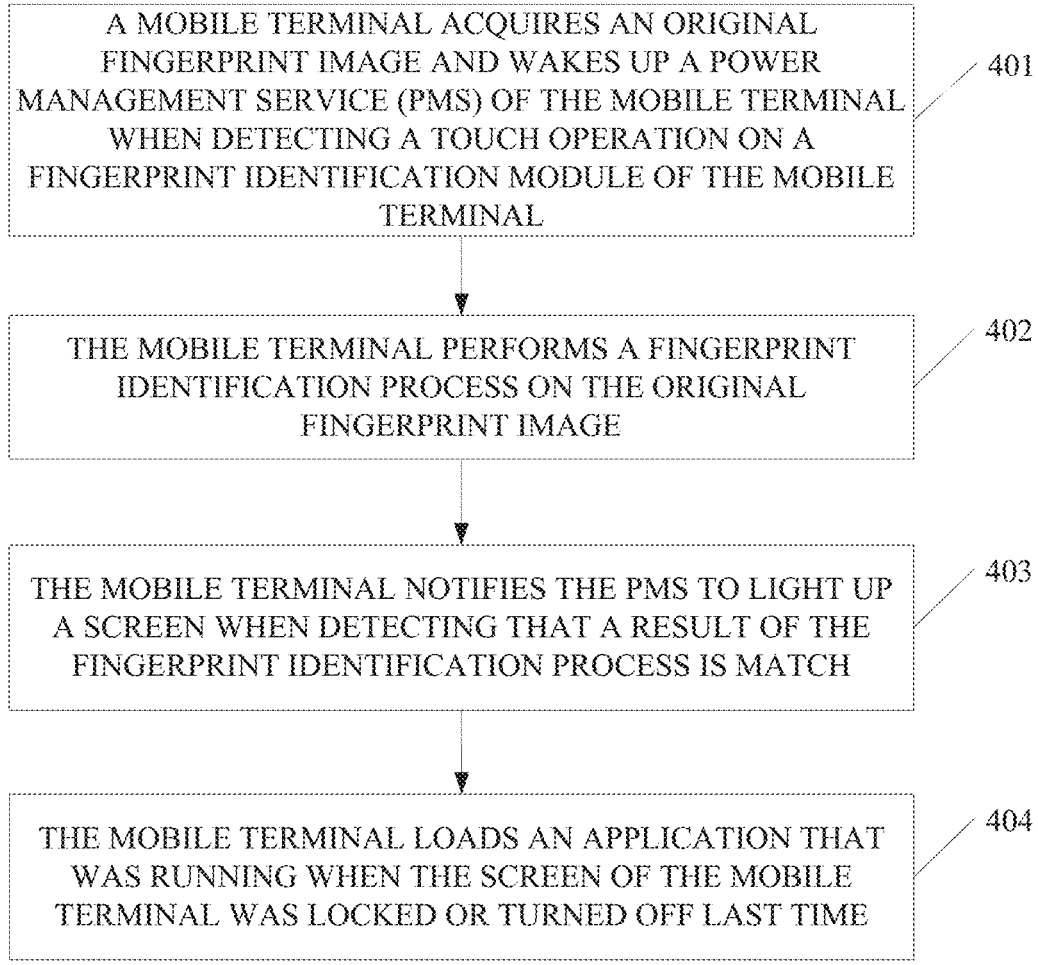
FIG. 4A is a schematic flow chart illustrating an unlocking method according to a second method implementation of the present disclosure.
Figure 4B:
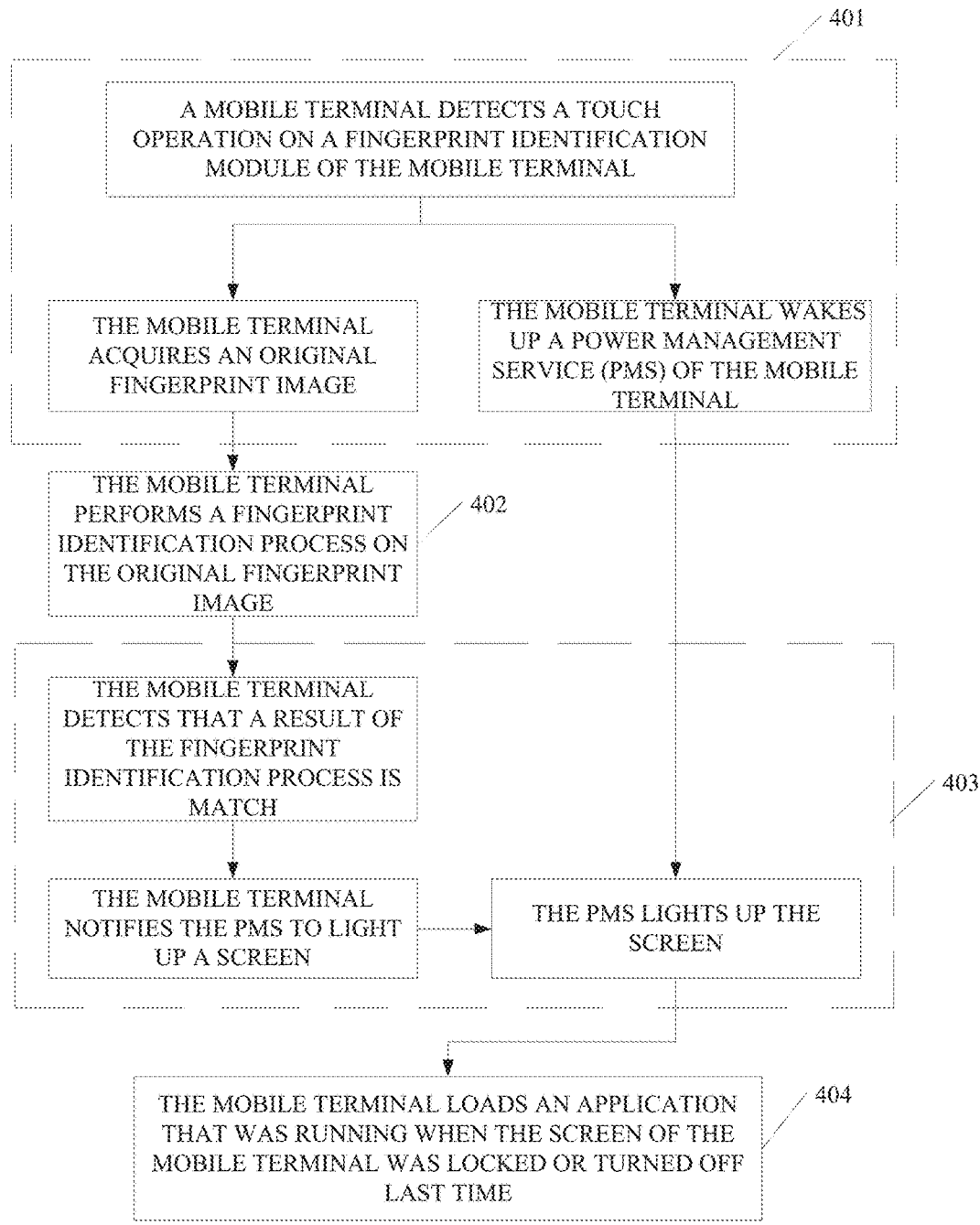
FIG. 4B is a schematic flow chart illustrating an unlocking method according to a second method implementation of the present disclosure.

FIGS. 4A and 4B are schematic flow charts illustrating an unlocking method according to a second method implementation of the present disclosure. As illustrated in FIGS. 4A and 4B, the method of the implementation of the disclosure beings at block 401.

At block 401, the mobile terminal acquires an original fingerprint image and wakes up a power management service (PMS) of the mobile terminal when detecting a touch operation on a fingerprint identification module of the mobile terminal.

At block 402, the mobile terminal performs a fingerprint identification process on the original fingerprint image.

At block 403, the mobile terminal notifies the PMS to light up a screen when detecting that a result of the fingerprint identification process is matched.

At block 404, the mobile terminal loads an application that was running when the screen of the mobile terminal was locked or turned off last time.

For example, the application that was running when the screen of the mobile terminal was locked or turned off last time is a music player. Consequently, the mobile terminal will load the music player after notifying the PMS to light up the screen. In this way, the application interface of the recently used application can be provided to the user quickly and conveniently and user experience can be improved.

According to the implementation, the mobile terminal can acquire the original fingerprint image to perform the fingerprint identification process and at the same time, wake up the PMS of the mobile terminal when detecting the touch operation on the fingerprint identification module of the mobile terminal. Thereafter, the mobile terminal can notify the PMS to light up the screen when detecting that the result of the fingerprint identification process is matched. As the mobile terminal starts to wake up the PMS when the touch operation on the fingerprint identification module of the mobile terminal is detected, when the mobile terminal detects that the result of the fingerprint identification process is matched, there is no need to consume additional time to wake up the PMS; instead, the mobile terminal notifies the PMS to light up the screen according to the result of the comparison directly. Consequently, for the mobile terminal, the total time of switching from a screen-off state to a screen-on unlock state can be shortened, so as to help to improve unlocking efficiency of the mobile terminal and user experience.

Moreover, the mobile terminal can timely load the application that was running when the screen of the mobile terminal was locked or turned off last time after notifying the PMS to light up the screen, so that the user can be provided with the application interface of the recently used application conveniently and the user experience can be improved.

Figure 5:
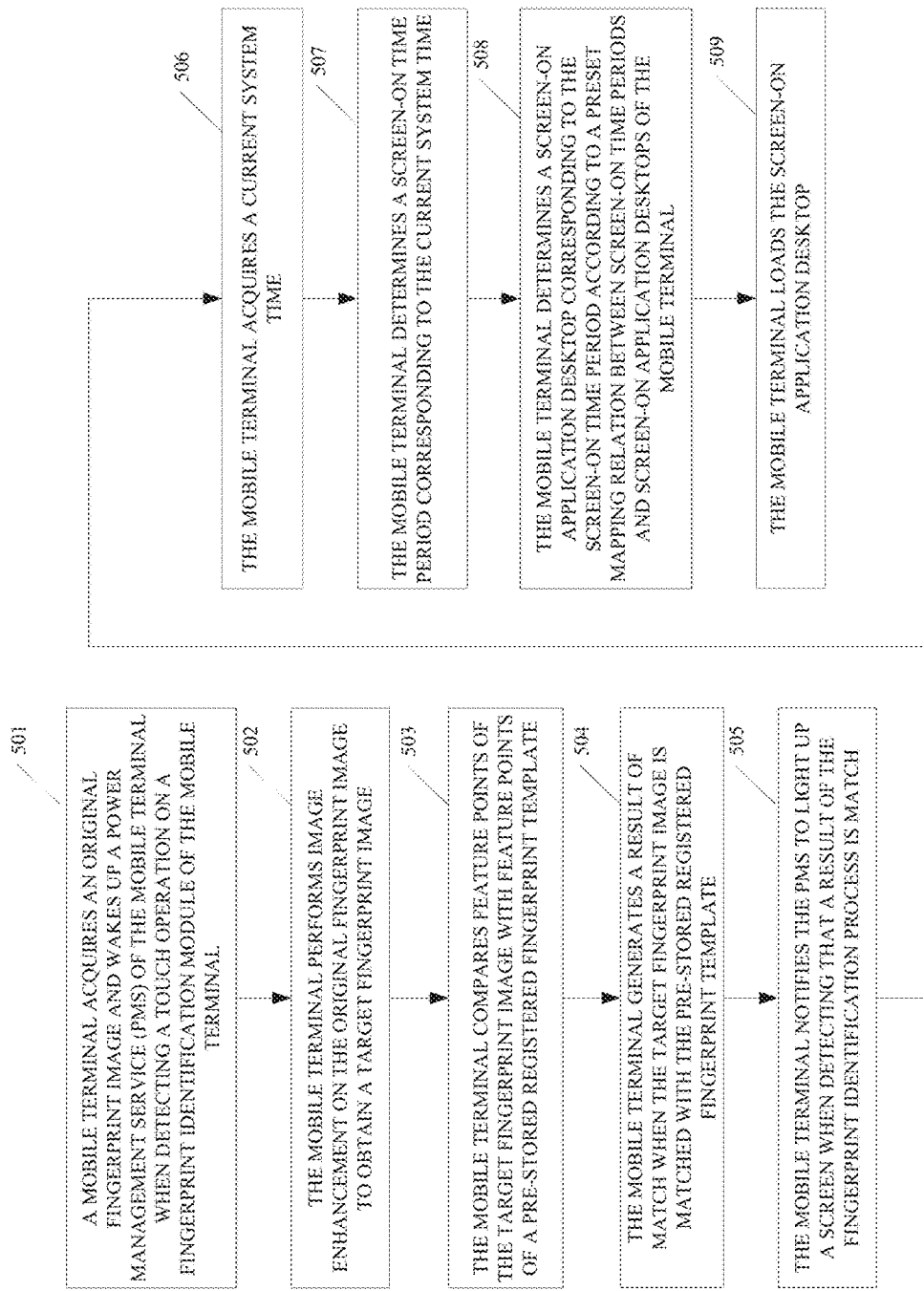
FIG. 5 is a schematic flow chart illustrating an unlocking method according to a third method implementation of the present disclosure.

FIG. 5 is a schematic flow chart illustrating an unlocking method according to a third method implementation of the present disclosure. As illustrated in FIG. 5, the method of the implementation of the disclosure begins at block 401.

At block 501, a mobile terminal acquires an original fingerprint image and wakes up a power management service (PMS) of the mobile terminal when detecting a touch operation on a fingerprint identification module of the mobile terminal.

At block 502, the mobile terminal performs image enhancement on the original fingerprint image to obtain a target fingerprint image.

At block 503, the mobile terminal compares feature points of the target fingerprint image with feature points of a pre-stored registered fingerprint template.

At block 504, the mobile terminal generates a result of a match when the target fingerprint image is matched with the pre-stored registered fingerprint template.

At block 505, the mobile terminal notifies the PMS to light up a screen when detecting that a result of the fingerprint identification process is matched.

At block 506, the mobile terminal acquires a current system time.

At block 507, the mobile terminal determines a screen-on time period corresponding to the current system time.

At block 508, the mobile terminal determines a screen-on application desktop corresponding to the screen-on time period according to a preset mapping relation between screen-on time periods and screen-on application desktops of the mobile terminal.

At block 509, the mobile terminal loads the screen-on application desktop.

For example, the mobile terminal includes three application desktops, that is, application desktop 1, application desktop 2, and application desktop 3. Application desktop 1 is mainly provided with office applications such as a notepad, a mailbox application, an intra-enterprise chat application, and so forth. Application desktop 2 is mainly provided with entertainment applications such as various game applications, music players, video players, etc. Application desktop 3 is mainly provided with other types of applications such as ride-hailing applications, various system applications, and the like. The user can preset a mapping relation between the three application desktops and different time periods. For example, 9:00 a.m. to 12:00 noon and 2:00 p.m. to 5:00 p.m. are set as working time periods and correspond to application desktop 1. 12:00 noon to 2:00 p.m. is set as an entertainment time period and corresponds to application desktop 2. When the mobile terminal detects that the current system time is 10:00 a.m., the corresponding screen-on time period is determined as the working time period. After the mobile terminal determines that application desktop 1 corresponds to the working time period, the mobile terminal loads application desktop 1. In this way, it is beneficial to improving convenience of the user in using applications corresponding to different time periods and user experience.

According to the implementation, the mobile terminal can acquire the original fingerprint image to perform the fingerprint identification process and at the same time, wake up the PMS of the mobile terminal when detecting the touch operation on the fingerprint identification module of the mobile terminal. And then, the mobile terminal can notify the PMS to light up the screen when detecting that the result of the fingerprint identification process is matched. Since the mobile terminal starts to wake up the PMS when detecting the touch operation on the fingerprint identification module of the mobile terminal, when the mobile terminal detects that the result of the fingerprint identification process is matched, there is no need to consume additional time to wake up the PMS; instead, the mobile terminal notifies the PMS to light up the screen according to the result of the comparison directly. As a result, the total time required to switch the mobile terminal from a screen-off state to a screen-on unlock state can be reduced, and unlocking efficiency of the mobile terminal and user experience can be improved.

In addition, after the mobile terminal notifies the PMS to light up the screen, the mobile terminal can load the screen-on application desktop corresponding to the screen-on time period in time, where the screen-on time period corresponds to the current system time. As a result, it is possible to improve convenience of using the application corresponding to the current time period by the user and user experience.

Figure 6:
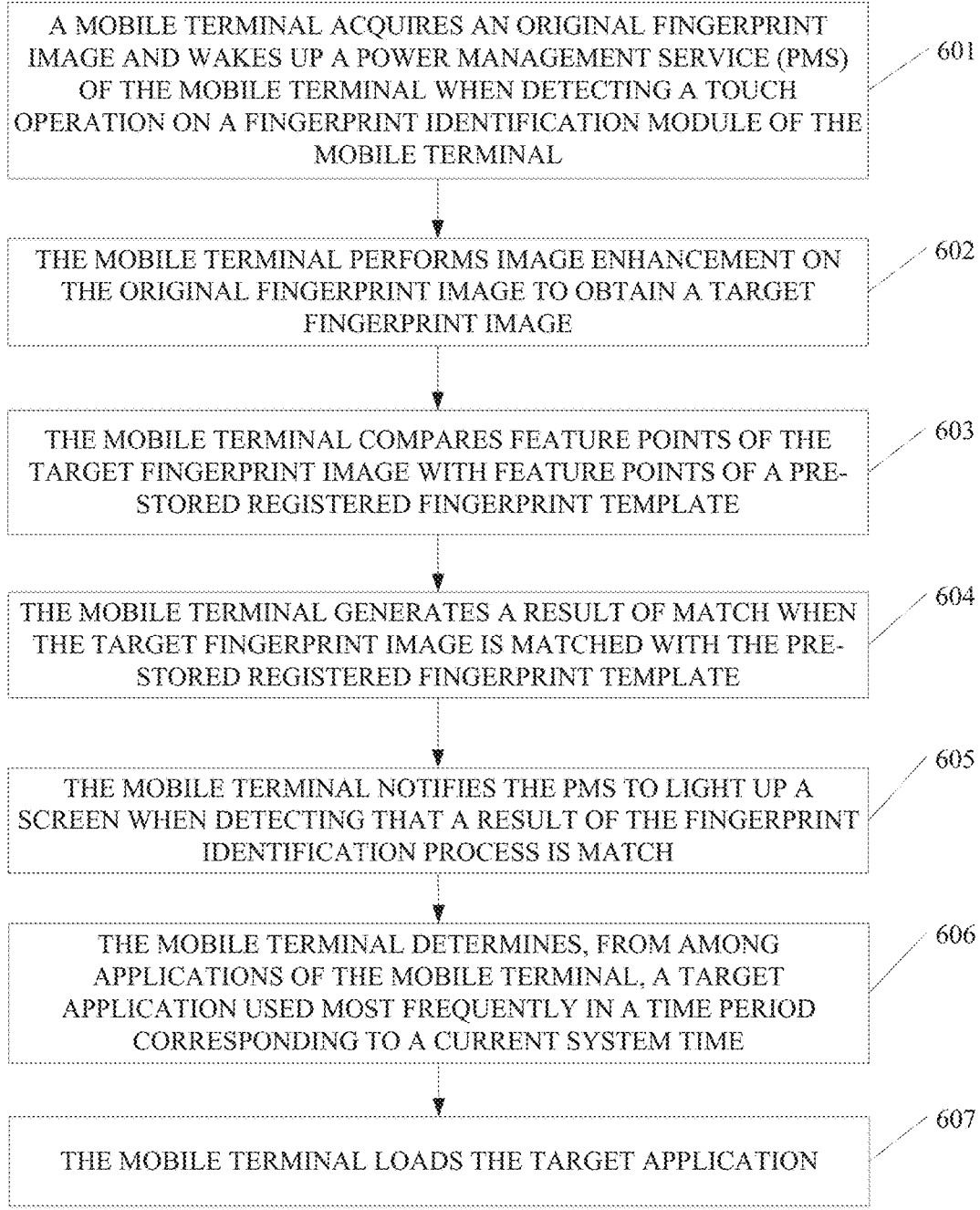
FIG. 6 is a schematic flow chart illustrating an unlocking method according to a fourth method implementation of the present disclosure.

FIG. 6 is a schematic flow chart illustrating an unlocking method according to a fourth method implementation of the present disclosure. As illustrated in FIG. 6, the method of the implementation of the disclosure begins at block 601.

At block 601, a mobile terminal acquires an original fingerprint image and wakes up a power management service (PMS) of the mobile terminal when detecting a touch operation on a fingerprint identification module of the mobile terminal.

At block 602, the mobile terminal performs image enhancement on the original fingerprint image to obtain a target fingerprint image.

At block 603, the mobile terminal compares feature points of the target fingerprint image with feature points of a pre-stored registered fingerprint template.

At block 604, the mobile terminal generates a result of a match when the target fingerprint image is matched with the pre-stored registered fingerprint template.

At block 605, the mobile terminal notifies the PMS to light up a screen when detecting that a result of the fingerprint identification process is matched.

At block 606, the mobile terminal determines, from among applications of the mobile terminal, a target application used most frequently in a time period corresponding to a current system time.

At block 607, the mobile terminal loads the target application.

For instance, the user usually opens the Uber™ app at 9:30 p.m., so the mobile terminal can record in advance usage times or usage frequencies of various applications used by the user after 9:00 p.m. in the last month for instance. After the mobile terminal notifies the PMS to light up the screen, the mobile terminal can query an application with the most usage time or highest usage frequency based on the recorded history record (usage times or usage frequencies of applications in a certain time period or different time periods) and loads the application. Therefore, the user can be provided with application loading service more conveniently and smartly and user experience can be improved.

The following describes a device implementation of the disclosure. The device implementation is configured to execute the methods of the method implementations.

Figure 7:
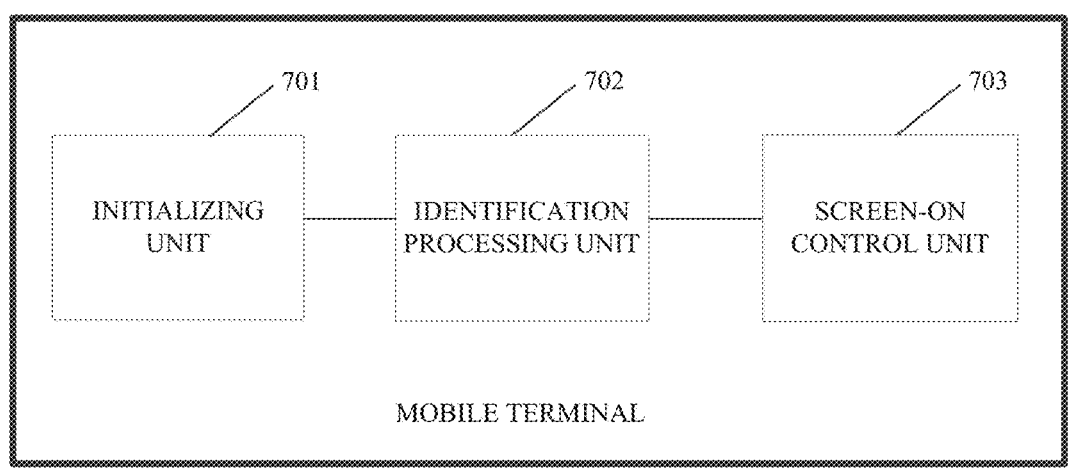
FIG. 7 is a block diagram illustrating a structure of a mobile terminal according to a device implementation of the present disclosure.

Based on the architecture of the mobile terminal illustrated in FIG. 1, the implementation of the disclosure provides a mobile terminal. FIG. 7 is a block diagram illustrating components of the mobile terminal according to a device implementation of the present disclosure.

As illustrated in FIG. 7, the mobile terminal can include an initializing unit 701, an identification processing unit 702, and a screen-on control unit 703. These components can be integrated into a fingerprint sensor for example. Alternatively, the initializing unit 701 and the identification processing unit 702 can be integrated into a fingerprint sensor and the screen-on control unit 703 can be integrated into a processor coupled with the fingerprint sensor.

The initializing unit 701 is configured to acquire an original fingerprint image and wake up a power management service (PMS) of the mobile terminal when detecting a touch operation on a fingerprint identification module of the mobile terminal.

The identification processing unit 702 is configured to perform a fingerprint identification process on the original fingerprint image.

The screen-on control unit 703 is configured to light up a screen of the mobile terminal via the PMS when the fingerprint identification process is successful, that is, when the result of the fingerprint identification process is matched.

The mobile terminal further includes a suspending unit.

The suspending unit is configured to notify the PMS to enter a suspending state (that is, PMS go to sleep) when the fingerprint identification process is failed, that is, when detecting that the result of the fingerprint identification process is not matched.

The identification processing unit 702 is configured to: perform image enhancement on the original fingerprint image to obtain a target fingerprint image, compare feature points of the target fingerprint image with feature points of a pre-stored registered fingerprint template, and generate a result of match when the target fingerprint image is matched with the pre-stored registered fingerprint template, or generate a result of not match when the target fingerprint image is not matched with the pre-stored registered fingerprint template.

The mobile terminal further includes a first loading unit, a second loading unit, and a third loading unit.

The first loading unit is configured to load an application desktop of a system of the mobile terminal after the screen-on control unit 703 notifies the PMS to light up the screen.

The second loading unit is configured to load an application that was running when the screen of the mobile terminal was locked or turned off last time after the screen-on control unit 703 notifies the PMS to light up the screen.

The third loading unit is configured to load a preset application after the screen-on control unit 703 notifies the PMS to light up the screen.

As one implementation, the mobile terminal has N applications running in the background and N is a positive integer.

The initializing unit 701 is further configured to obtain screen-on starting priorities corresponding to the N applications after the screen-on control unit 703 notifies the PMS to light up the screen.

The mobile terminal further includes a fourth loading unit.

The fourth loading unit is configured to load an application having the highest screen-on starting priority among the N applications.

As one implementation, the initializing unit 701 is further configured to acquire a current system time.

The mobile terminal further includes a determining unit and a fifth loading unit.

The determining unit is configured to determine a screen-on time period corresponding to the current system time. The determining unit is further configured to determine a screen-on application desktop corresponding to the screen-on time period according to a preset mapping relation between screen-on time periods and screen-on application desktops of the mobile terminal.

The fifth loading unit is configured to load the screen-on application desktop.

It is to be noted that, the mobile terminal described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

For example, those skilled in the art may understand that the form of hardware carriers of the mobile terminal may be the mobile terminal 100 illustrated in FIG. 1.

Functions of the initializing unit 701 can be achieved by the processor 101 and the memory 102 of the mobile terminal 100. As one implementation, the processor 101 executes the initializing module in the memory 102 to acquire the original fingerprint image and wake up the PMS of the mobile terminal.

Functions of the identification processing unit 702 can be implemented by the processor 101 and the memory 102 of the mobile terminal 100. As one implementation, the processor 101 executes the identification processing module in the memory 102 to perform the fingerprint identification process on the original fingerprint image.

Functions of the screen-on control unit 703 can be realized by the processor 101 and the memory 102 of the mobile terminal 100. As one implementation, the processor 101 executes the screen-on control module in the memory 102 to notify the PSM to light up the screen.

According to the implementation of the disclosure, the initializing module of the mobile terminal acquires the original fingerprint image and at the same time, wakes up the PMS of the mobile terminal when detecting the touch operation on the fingerprint identification module of the mobile terminal. Thereafter, the identification processing module of the mobile terminal performs the fingerprint identification process on the original fingerprint image. At last, the screen-on control module of the mobile terminal notifies the PMS to light up the screen when detecting that the result of the fingerprint identification process is matched. As the mobile terminal starts to wake up the PMS when the touch operation on the fingerprint identification module of the mobile terminal is detected, when the mobile terminal detects that the result of the fingerprint identification process is matched, there is no need to consume additional time to wake up the PMS; instead, the mobile terminal notifies the PMS to light up the screen according to the result of the comparison directly. Consequently, for the mobile terminal, the total time of switching from a screen-off state to a screen-on unlock state can be shortened, so as to help to improve unlocking efficiency of the mobile terminal and user experience.

Implementations of the present disclosure also provide a computer readable storage medium. The computer readable storage medium can store programs which, when executed, can implement all or part of the operations of any of the unlocking methods described in the above-described method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for power management using fingerprint identification in a mobile terminal, comprising:
   acquiring an original fingerprint image and at the same time waking up a power management service (PMS) of the mobile terminal when detecting a touch operation on a fingerprint identification module of the mobile terminal, the PMS being configured for lighting up a screen;
   performing a fingerprint identification process on the original fingerprint image;
   lighting up the screen by the PMS when the fingerprint identification process is successful;
   acquiring a current system time;
   determining a screen-on time period corresponding to the current system time;
   determining a screen-on application desktop corresponding to the screen-on time period according to a preset mapping relation between the screen-on time periods and the screen-on application desktops of the mobile terminal;
   loading the screen-on application desktop;
   determining, from among applications of the mobile terminal, a target application used most frequently in a time period corresponding to the current system time; and
   loading the target application.

2. The method of claim 1, further comprising:
   prior to acquiring the original fingerprint image and waking up the PMS, initiating an interrupt request to trigger acquisition of the original fingerprint image upon detection of the touch operation.

3. The method of claim 2, further comprising:
   prior to waking up the PMS, notifying the PMS to wake up in response to the interrupt request.

4. The method of claim 1, further comprising:
   after the fingerprint identification process, judging whether the fingerprint identification process is successful.

5. The method of claim 1, further comprising:
   notifying the PMS to enter a suspending state when the fingerprint identification process is failed.

6. The method of claim 1, wherein performing the fingerprint identification process on the original fingerprint image comprises:
performing image enhancement on the original fingerprint image to obtain a target fingerprint image; and
comparing feature points of the target fingerprint image with feature points of a pre-stored registered fingerprint template.

7. The method of claim 1, further comprising:
after lighting up the screen by the PMS, performing one of:
loading an application desktop of a system of the mobile terminal;
loading an application that was running when the screen of the mobile terminal was locked or turned off last time; and
loading a preset application.

8. The method of claim 1, wherein N applications are running in the background of the mobile terminal and N is a positive integer; the method further comprising:
after lighting up the screen by the PMS, obtaining screen-on starting priorities corresponding to the N applications; and
loading an application having the highest screen-on starting priority among the N applications.

9. A mobile terminal, comprising:
a memory, configured to store executable program codes; and
a processor, coupled with the memory, wherein the processor is configured to invoke the executable program codes stored in the memory to:
acquire an original fingerprint image and at the same time wake up a power management service (PMS) of the mobile terminal when detecting a touch operation on a fingerprint identification module of the mobile terminal, the PMS being configured for lighting up a screen;
perform a fingerprint identification process on the original fingerprint image;
light up the screen by the PMS when the fingerprint identification process is successful;
acquire a current system time;
determine a screen-on time period corresponding to the current system time;
determine a screen-on application desktop corresponding to the screen-on time period according to a preset mapping relation between screen-on time periods and screen-on application desktops of the mobile terminal;
load the screen-on application desktop;
determine, from among applications of the mobile terminal, a target application used most frequently in a time period corresponding to a current system time; and
load the target application.

10. The mobile terminal of claim 9, wherein the processor is further configured to:
notify the PMS to enter a suspending state when the fingerprint identification process is failed.

11. The mobile terminal of claim 9, wherein the processor configured to perform the fingerprint identification process on the original fingerprint image is configured to:
perform image enhancement on the original fingerprint image to obtain a target fingerprint image; and
compare feature points of the target fingerprint image with feature points of a pre-stored registered fingerprint template.

12. The mobile terminal of claim 9, wherein the processor is further configured to:
after the processor lights up the screen by the PMS, perform one of:
loading an application desktop of a system of the mobile terminal;
loading an application that was running when the screen of the mobile terminal was locked or turned off last time; and
loading a preset application.

13. The mobile terminal of claim 9, wherein N applications are running in the background of the mobile terminal and N is a positive integer; and the processor is further configured to:
after the processor lights up the screen by the PMS, obtain screen-on starting priorities corresponding to the N applications; and
load an application having the highest screen-on starting priority among the N applications.

14. The mobile terminal of claim 9, wherein the processor is further configured to initiate an interrupt request to trigger the acquisition of the original fingerprint image.

15. The mobile terminal of claim 9, wherein the processor is further configured to notify the PMS of results of the fingerprint identification process, wherein the PMS determines whether the fingerprint identification process is successful.

16. A non-transitory computer storage medium, configured to store programs that, when executed, are configured to:
acquire an original fingerprint image and at the same time wake up a power management service (PMS) of a mobile terminal when detecting a touch operation on a fingerprint identification module of the mobile terminal, the PMS being configured for lighting up a screen;
perform a fingerprint identification process on the original fingerprint image;
light up the screen via the PMS when the fingerprint identification process is successful;
acquire a current system time;
determine a screen-on time period corresponding to the current system time;
determine a screen-on application desktop corresponding to the screen-on time period according to a preset mapping relation between screen-on time periods and screen-on application desktops of the mobile terminal;
load the screen-on application desktop;
determine, from among applications of the mobile terminal, a target application used most frequently in a time period corresponding to a current system time; and
load the target application.

17. The non-transitory computer storage medium of claim 16, wherein the programs are further configured to:
notify the PMS to enter a suspending state when the fingerprint identification process is failed.

18. The non-transitory computer storage medium of claim 16, wherein the programs configured to perform the fingerprint identification process on the original fingerprint image are configured to:
perform image enhancement on the original fingerprint image to obtain a target fingerprint image; and
compare feature points of the target fingerprint image with feature points of a pre-stored registered fingerprint template.

19. The non-transitory computer storage medium of claim 16, wherein the programs are further configured to:
after lighting up the screen by the PMS, perform one of:

loading an application desktop of a system of the mobile terminal;

loading an application that was running when the screen of the mobile terminal was locked or turned off last time; and loading a preset application.

20. The non-transitory computer storage medium of claim 16, wherein N applications are running in the background of the mobile terminal and N is a positive integer; and the programs are further configured to:

after lighting up the screen by the PMS, obtain screen-on starting priorities corresponding to the N applications; and load an application having the highest screen-on starting priority among the N applications.

* * * * *